United States Patent Office 3,563,831
Patented Feb. 16, 1971

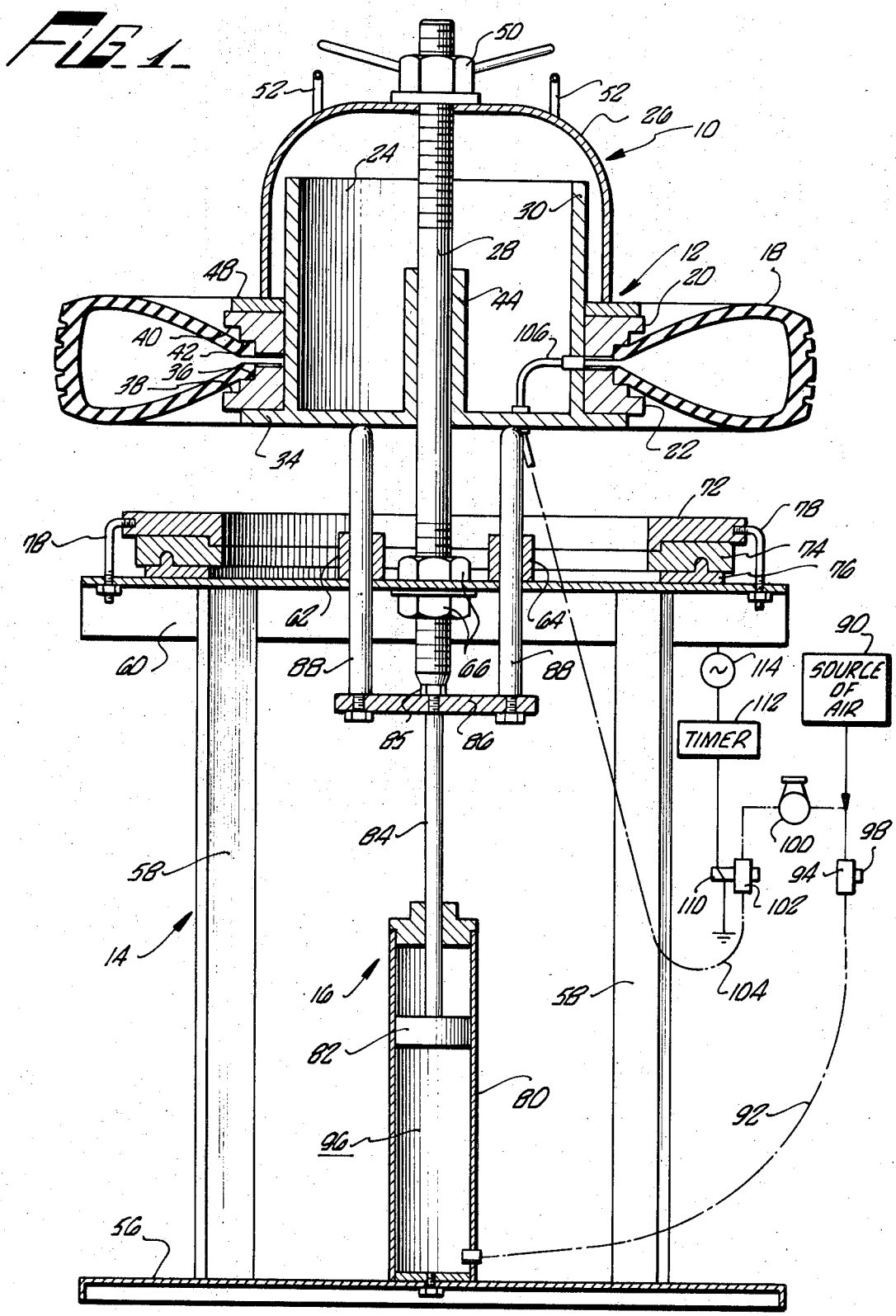

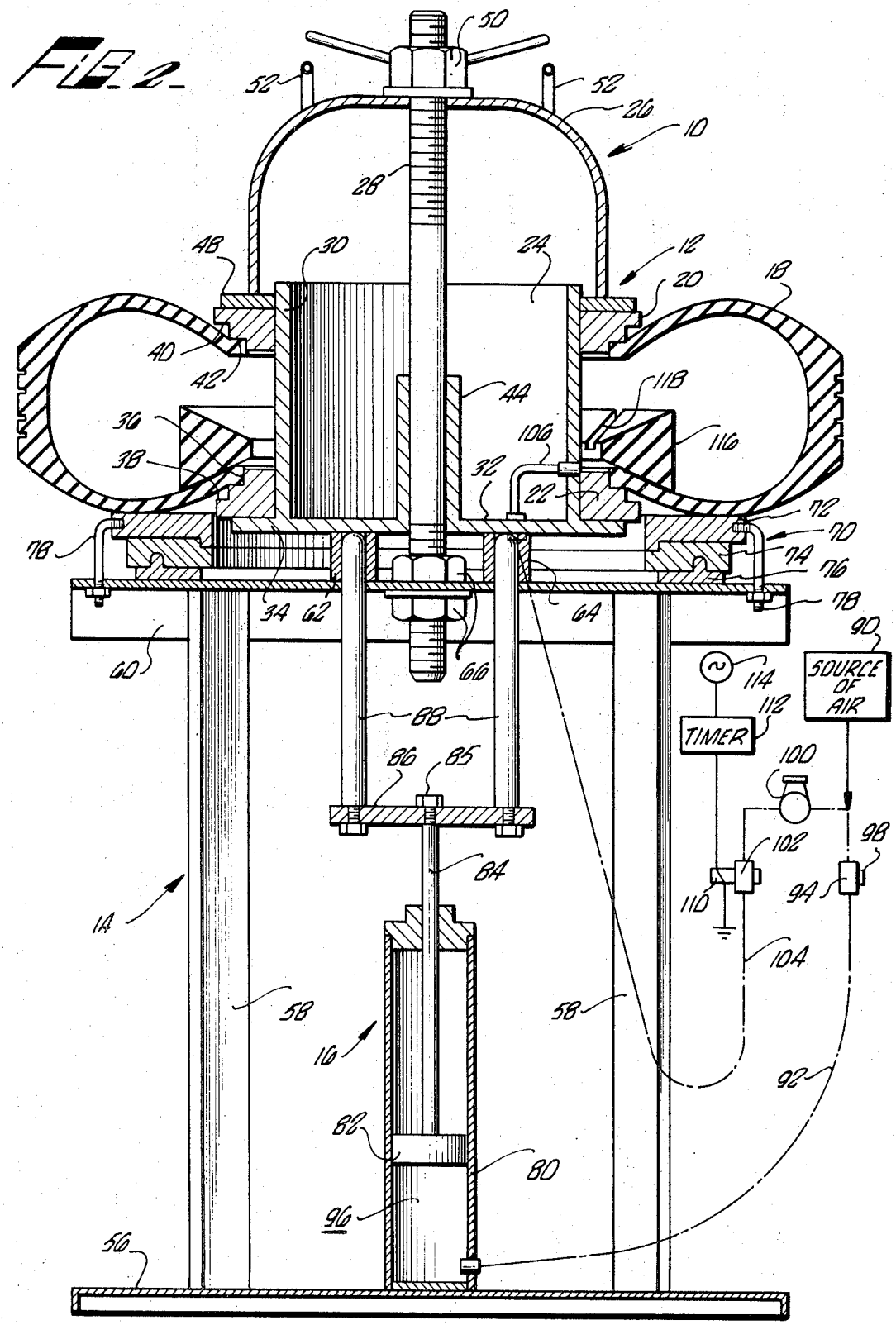

3,563,831
TUBELESS SIDEWALL MOLD FOR TIRES
Maurice Clapp and William M. Conley, Jr., Redlands, Calif., assignors to Clapp's Equipment Div., Mentone, Calif., a corporation of California
Filed Aug. 30, 1968, Ser. No. 756,613
Int. Cl. B29h 5/24, 17/04
U.S. Cl. 156—366
17 Claims

ABSTRACT OF THE DISCLOSURE

A pressure head closes a mounting drum's interior and bears against an upper bead ring to maintain the upper bead ring fixed relative to a lower bead ring and a curing matrix. A pneumatic ejection cylinder is operative to raise the mounting drum and lower bead ring above the curing matrix to collapse the beads of a tire and seat the beads in the upper and lower bead rings. Upon inflation of the tire, air pressure within the tire's interior forces the lower bead ring and the mounting drum downward against stops into a curing position. In the curing position, the lower sidewall of the tire will abut against the curing matrix for the application of a sidewall strip. After the sidewall strip is cured, the inflation pressure is released. The lower bead ring and drum will then rise by action of the pneumatic cylinder to carry the lower sidewall of the tire above the curing matrix. The tire may then be removed from the mold.

BACKGROUND OF THE INVENTION

The present invention relates to the art of applying sidewall strips to tires and, in particular, to a sidewall molding apparatus operable without the use of an inflation tube.

In the tire recapping industry, the conversion of black sidewall tires to premium wall tires enhances the marketability of recapped tires. Black wall tire trade-ins, for example, may be converted into premium wall tires by applying a white sidewall or other decorative colored wall to the tires. This conversion has reduced recappers' backlogs in surplus black wall tires while supplying an adequate supply of premium wall tires.

One prior art method for the conversion of a black wall tire to a premium wall tire utilizes a fixed wheel or collar type sidewall mold for the mounting of a tire with its sidewall placed against a sidewall curing matrix. The tire is inflated through an inflation tube to a curing pressure of, say, 50 to 60 pounds per square inch to force the tire's sidewall into intimate contact with a decorative sidewall strip on a curing matrix. The inner tube is a source of added labor and therefore adds to the cost of black wall conversion. Moreover, the inflation pressure required often leads to the pinching of the inflation tube at the tire's beads. This pinching causes the failure of the inflation tube. The failure of this tube causes the loss of inflation pressure and the loss of the force required between the sidewall of the tire and the curing matrix necessary to obtain a satisfactory cure of the decorative rubber strip to the tire.

In some cases the fixed wheel sidewall molds are used without an inflation tube. But, regardless of whether an inflation tube is used, the fixed wheel sidewall molds produce tire skidding radially outward on the curing matrix as the tire in inflated. This skidding causes the decorative rubber to be displaced relative to the tire and therefore produces unsatisfactory results.

Attempts have been made in the past to overcome the problems inherent with the skidding attendant with fixed wheel sidewall molds. Typical of these attempts are disclosed in U.S. Pat. 3,113,902 to W. O. Dismuke and U.S. Pat. 3,329,551 to K. A. Hutchinson. Both patentees employ discs to engage the beads of a tire. These discs are carried such that a spring normally biases a tire away from a curing matrix. Air pressure is used to lower the discs and press the sidewall of the tire against the curing matrix. The air pressure must overcome the counteracting force produced by the spring. However, the counteracting spring force is not constant. With increasing displacement of the lower disc and lower sidewall of the tire, greater and greater pressures must be used to compress the springs.

One problem presented by the ever-increasing resistance of the springs to compression is in the adaptation of the mold to accept different tires having different weights. With different weight tires the load on the springs varies and therefore it is difficult to obtain the required curing force between the sidewall of a tire and the curing matrix in all cases.

Another problem experienced with the use of springs is in obtaining sufficient displacement of the tire above the curing matrix before the tire is inflated. It is highly desirable to collapse the tire beads together to obtain a satisfactory seat with the tire bead engaging seats. With wide cross section and flat tires, several inches, for example three inches, of displacement are required to expand the tire from a position where its beads are collapsed together to the curing position against the curing matrix. This amount of displacement is difficult to obtain with springs because the inflation pressures required to overcome the spring force and expand the tire for pressing its sidewall against the curing matrix would be excessive.

Adequate tire displacement above the mold matrix is also necessary in sidewall molds to readily accommodate different size and shape tires. Without adequate displacement capacity, special arms or the like are required to distort some tires sufficiently to insure uniform contact of the sidewall against the curing matrix. This distortion requirement also makes it advisable to shape the curing surface of the curing matrix to fit the shape of the sidewall. Because of different sidewall shapes, several curing matrices are necessary to accommodate the wide variety of tires in use today.

Thus, there is a present need for a mold for applying decorative sidewalls to tires which produces satisfactory contact of the tire sidewall with the decorative strip and curing matrix without displacement of the tire with respect to its decorative strip and which is versatile enough to accept many different types and styles of tires.

SUMMARY OF THE INVENTION

The present invention provides an improved sidewall mold which avoids tire skidding or displacement, and which is extremely versatile in the types of tires it may handle.

In general, the present invention contemplates the use of upper and lower bead engaging seats which are movable with respect to each other in response to fluid pressure. The upper and lower bead engaging seats, which may be in the form of annular bead rings, are carried by a tire carriage for movement between a bead collapsed position and a bead expanded position. The bead collapsed position has the bead seats disposed sufficiently close together to collapse the beads of a tire towards each other and firmly seat the tire's beads in the seats. The bead expanded position has one of the bead engaging seats spaced apart from the other bead engaging seat in position to effect pressure engagement of a sidewall of a tire against a curing matrix. Means operable through the continuous application of fluid pressure are provided for forcing the bead engaging seats into the bead collapsed position. Means are also provided to inflate the tire with air and move the bead engaging seats into the bead expanded position by overcoming the counteracting force of the fluid pressure which tends to force the bead engaging seats together. The tire carriage and the curing matrix are mounted on a base.

Preferably, the means for providing a continuous fluid pressure to urge the bead engaging seats into the bead collapsed position comprises a pneumatic cylinder having a displaceable piston and a piston shaft. At the upper end of the piston shaft, a head is secured which carries at least two push rods. These push rods are operable to force the lower bead engaging seat upwardly from the curing matrix. The force applied by pneumatic pressure within the cylinder is overcome when the tire is inflated by a force produced by the inflation pressure which acts downwardly on the lower bead engaging seat. As such, the inflation pressure forces the lower bead engaging seat downwardly towards the curing matrix against stops on the base. The lower sidewall of the tire will then be carried into pressure contact with the curing matrix when the tire is inflated.

The tire carriage is preferably in the form of a mounting drum which has a relatively large diameter. The mounting drum has a base which is acted on by the pneumatic cylinder through the push rods. Adjustable stops are provided on the base to properly position the drum relative to the curing matrix. The bead engaging seats take the form of two spaced apart, coaxially mounted, annular bead rings. These bead rings are preferably stepped to accept different diameter tires. The bead rings and mounting drum are fully described in U.S. Pat. 3,313,328 to Maurice Clapp. A shaft is anchored to the base and extends coaxially through the mounting drum. A pressure head having an annular foot ring at its lower end caps the mounting drum and is removably secured in position by such means as a locking nut. The annular foot ring bears against the upper surface of the upper bead ring to maintain its position fixed relative to the curing matrix.

In order to prevent overcuring of a tire, means are preferably provided to automatically exhaust the inflation pressure. The means include a solenoid-operated inflation valve having a timer. Through the inflation valve, air is admitted into the interior of the tire to force its lower sidewall into curing relationship with the curing matrix. After a predetermined curing time, for example, twenty minutes, the timer actuates the inflation valve to cause the air within the tire to be exhausted. When the air within a tire is exhausted, the pneumatic cylinder forces the mounting drum and is carried lower bead ring upwardly. With this upward movement, the sidewall of the tire, with its cured decorative strip, is carried above the matrix. This avoids overcuring without any operator attendance.

An internal expander ring may also be provided. This ring is used to spread the beads of badly damaged tires or tires which have been stacked for long periods. The bead expander spreads the beads and forces them against the bead rings until inflation pressure can maintain the seal.

The present invention has many advantages as a sidewall curing apparatus.

The problem of tire sidewall displacement relative to the curing matrix is overcome by allowing the tire's inflation to be the operative force in the pressure engagement of the tire's sidewall with the curing matrix. This is possible because of the displaceable lower bead ring. The utilization of tire inflation also assures uniform contact of the tire's sidewall with the mold matrix.

In addition, the problems experienced with prior art molding apparatus in the use of compression springs to carry their lower bead engaging seats is overcome. The pressure within the pneumatic cylinder is constant regardless of the position of the lower bead ring. As such, the lower bead ring's position is determined by the inflation pressure. Therefore, a broad range of tire sizes, geometries and cross sections may be accommodated by the molding apparatus of the present invention.

In addition, the molding apparatus of the present invention makes it possible to raise the lower bead ring relatively far above the curing matrix while collapsing the beads together. This feature, with the adjustable spacer stops, enables the molding apparatus to accommodate tires having wide cross sections and flat profiles. This relatively large displacement capacity of the lower bead above the mold matrix also eliminates the requirement of special apparatus to distort the tire into uniform contact with the mold matrix and the specially shaped mold matrices which should be employed with such special apparatus.

These and other features, aspects and advantages of the present invention will become apparent from the following description, appended claims and drawings.

BRIEF DESCRIPTION OF THE FIGURES

FIG. 1 is an elevational view, partly in half section, of a preferred form of the sidewall mold of the present invention as it appears with a tire's beads collapsed just before or after the application of a decorative strip to the lower sidewall of the carried tire; and FIG. 2 illustrates the disposition of the apparatus, illustrated in FIG. 1 in the curing position.

DESCRIPTION OF THE PREFERRED EMBODIMENTS

FIGS. 1 and 2 illustrate the construction of a preferred embodiment 10 of the decorative sidewall mold of the present invention.

In general, sidewall mold 10 includes a tire carriage 12, a base 14 and a pneumatic positioning assembly 16. The tire carriage supports a tire 18 through a pair of annular bead rings 20 and 22. Upper bead ring 20 is maintained in fixed relationship with respect to base 14. Lower bead ring 22, however, is capable of vertical movement with respect to its carrying drum 24 and base 14. This vertical movement is effected through pneumatic positioning assembly 16 by the raising of drum 24 in response to pneumatic pressure. Lower bead ring 22 reaches its FIG. 2 orientation through the admission of air into the interior cavity of tire 18.

In greater detail, tire carriage 12 includes mounting drum 24, a pressure head 26 and a centrally disposed shaft 28. As described in U.S. Pat. 3,313,328 to Maurice Clapp, mounting drum 24 has a relatively large diameter and includes a generally cylindrical portion 30. A drum base 32 extends across the bottom of drum 24 and includes an annular, radially extending flange 34 which extends externally from its juncture with cylindrical portion 30. Lower bead ring 22 is supported by this annular flange.

The lower bead ring is stepped at 36 and 38 in order to accept different bead diameter tires. Complementary upper bead ring 20 is also stepped at 40 and 42 to cooperate with lower bead ring 22 in accepting the different bead diameter tires. The upper and lower bead rings provide an airtight seal at the beads of tire 18 and along the cylindrical outside of drum 24.

A hub 44 is disposed coaxially with the vertical axis of drum 24 and journals shaft 28.

Pressure head 26 is in the form of an enclosing dome. An annular foot or ring 48 is attached to pressure head 26 for bearing against and restraining upper bead ring 20. Shaft 28 extends through pressure head 26. The pressure head is secured to base 14 through shaft 28 by a removable locking nut 50. A pair of handles 52 are provided on pressure head 26 to facilitate its removal and mounting.

Base 14 includes horizontal stand base 56 to support sidewall mold 10 on a shop floor or the like. Vertical legs 58 extend from their attachment on stand base 56 for the support of a table or platform 60. The table or platform is secured to these legs as by welding. A pair of cylindrical stops 62 and 64, which are replaceable by ones of different length, are set loosely over the push rods, to be described, on the upper surface of table 60. These cylindrical stops have axial holes for receiving the push rods to allow the push rods to move freely within them. The length of cylindrical stops 62 and 64 determines the lower position of tire carriage 12 and, as a consequence, the position of a tire's sidewall on the mold matrix. Holes in the table are provided as well for these push rods which are in register with the holes in cylindrical stops 62 and 64. Shaft 28 is anchored in table 60 as by a pair of nuts 66.

A curing matrix assembly 70 is mounted on table 60 in a well known manner. Briefly, however, the curing matrix assembly includes a ring-shaped curing matrix 72 disposed concentrically with the axis of tire carriage 12, a heating platen 74 disposed immediately below curing matrix 72 for providing the required heat energy to effect curing, and an insulating board 76 to space and insulate heating platen 74 from the top of table 60. Assembly 70 is secured to table 60 through a plurality of fasteners 78.

Pneumatic positioning assembly 16 includes a pneumatic ejection cylinder 80 and a piston 82. A piston shaft 84 extends through the top of ejection cylinder 80 and is secured at its upper end as through a fastener 85 to a carriage or head 86. Head 86 may be in the form of a cylindrical plate or a flat bar, depending on the number of push rods employed. In any event, head 86 is secured to a plurality of push rods 88. In the embodiment illustrated, only two push rods are employed. However, more push rods may be used. Push rods 88 extend through cylindrical stops 62 and 64 for carrying tire carriage 12. The upper limit of travel, shown in FIG. 1, is determined by fastener 85 contacting the lower end of shaft 28.

Ejection cylinder 80 is in air communication with a source of air 90 through a line 92. A three-way valve 94 is disposed in line 92 for controlling the air pressure in a lower chamber 96 of ejection cylinder 80. This three-way valve has an exhaust port 98 for venting chamber 96.

Means are provided to inflate the interior of tire 18. These means include the source of air 90, a pressure regulator 100, a solenoid-actuated, three-way valve 102, and line 104. Line 104 is connected to a line 106 and is in communication with the source of air, through regulator 100 and solenoid valve 102. Communication with the interior of tire 18 is effected through line 106 which passes through drum base 32 for its connection to line 104 and cylindrical wall 30 of drum 24. At its opening through wall 30, line 106 is in communication with the interior of tire 18. The interior of drum 24 does not experience the inflation pressures in tire 18. As such, the possibility of a dangerous explosion of the drum and pressure head 26 is avoided.

Solenoid-operated valve 102 includes a solenoid 110. A timer 112 is connected in series between solenoid 110 and a source of electrical power 114. The timer, which is commercially available, may be set for any desired curing time. When the timer is actuated, solenoid 110 is energized by power source 114 and valve 102 is open to the source of air. When the time cycle is over, solenoid 110 is taken out of circuit by timer 112 and valve 102 closes.

An annular expander ring 116, illustrated only in FIG. 2, is provided to insure the seating of the beads of tire 18 in the steps of upper and lower bead rings 20 and 22. The expander ring illustrated has a generally wedge-shaped cross section to enable its use with either of the step diameters illustrated. The expander ring may, however, have a complementary step configuration if desired. One or more air passages 118 in expander 116 provide air communication between the annulus defined between the inside surface of the expander and cylindrical portion 30 to the interior of tire 18. The diverging taper of the upper and lower surfaces of the bead expander ring provide bearing against the inside of a tire's beads regardless of what diameter steps the beads are engaged with.

The operation of the decorative sidewall mold will now be described.

Tire 18 is mounted, with expander ring 116 within it, on tire carriage 12. Valve 102 is off to prevent air from entering the interior of tire 18. Air is admitted through three-way valve 94 into chamber 96 of ejection cylinder 80. Piston 82 and shaft 84 will then rise, carrying with them push rods 88. Push rods 88 push tire carriage 12 into the FIG. 1 position. Upper annular bead ring 20 is maintained in fixed position by the downward force applied by annular foot 48 through pressure head 26. As was previously described, pressure head 26 is maintained in fixed position by its connection with shaft 28. Without expander ring 116, annular flange 34 will raise lower bead ring 22 to proximate the beads of tire 18 to firmly seat the beads of tire 18 within the appropriate steps in the bead rings. With expander ring 116, annular flange 34 in raising will force the tire's beads against the expander ring to seat the beads in the steps of the bead rings.

A strip of decorative rubber is then placed on curing matrix 72 or on tire 18 in a well known manner. Inasmuch as this aspect of the invention is well known, it will not be described further.

Timer 112 is then set for the desired curing time. When this is done, valve 102 will open by the energizing of solenoid 110 and air will be admitted through regulator 100 into the interior of tire 18. The regulator reduces the air pressure to the desired pressure of inflation of tire 18, which may be between 50 and 60 pounds per square inch. Because of the surface area within tire 18, the force felt by lower bead ring 22 will exceed that applied through ejection cylinder 80. As such, tire carriage 12 will lower into the FIG. 2 position. In this position, drum base 32 rests against cylindrical stops 62 and 64. The sidewall of tire 18 will be in pressure curing engagement with the strip of decorative rubber on curing matrix 72. Inflation pressure with tire 18 is maintained because upper and lower bead rings 20 and 22 provide a seal against drum 24 and at the tire's beads.

At the completion of the curing cycle, for example, twenty minutes, timer 112 will time out to interrupt the circuit to solenoid 110, and valve 102 will close. At this time the pressure within chamber 96 will raise push rods 88 and tire carriage 12 into the FIG. 1 position. The decorative strip has then been applied to tire 18.

Heating platen 74 is left energized for the next decorative strip application. Valve 94 remains open to maintain tire carriage 12 elevated above curing matrix 72. Pressure head 26 and upper bead ring 20 are removed to allow the removal of tire 18 and the mounting of another tire.

The present invention has been described with reference to certain preferred embodiments. The spirit and scope of the appended claims should not, however, necessarily be limited to the foregoing description.

What is claimed is:

1. An apparatus for applying a sidewall strip to a tire comprising:
    (a) a base;
    (b) a curing matrix on the base;
    (c) a tire carriage mounted on the base having
        (i) an upper tire bead engaging seat for engaging the upper bead of a tire,
        (ii) a lower tire bead engaging seat for engaging the lower bead of a tire, and
        (iii) means for supporting the upper and lower bead engaging seats in a bead collapsed position and a bead expanded position, the bead collapsed position being with the bead seats disposed sufficiently close together to collapse the beads of a tire towards each other and firmly seat the tire's beads in the bead engaging seats, the bead engaging seats in the bead collapsed position being sufficiently above the curing matrix to maintain the lower sidewall of a tire carried by the bead engaging seats spaced above the curing matrix, the bead expanded position being with the bead engaging seats spaced apart and the lower sidewall of the tire in curing position against the curing matrix;

(d) means operative through the application of fluid pressure to force the bead engaging seats into the bead collapsed position; and (e) means to inflate the tire with air and expand the bead engaging seats into the bead expanded position by overcoming the effect of the fluid pressure which tends to maintain the bead engaging seats in the bead collapsed position, the tire inflation means including adjustable timer means operative to deflate the tire after a predetermined curing time.

2. The apparatus claimed in claim 1 wherein:

(a) the upper tire bead engaging seat is removably mounted to the base in fixed position relative to the curing matrix; and (b) the fluid pressure means includes a fluid actuated ejection cylinder, the piston of the ejection cylinder being operatively coupled to the lower bead seat such that upon the application of a predetermined fluid pressure on one side of the piston the lower bead seat is urged towards the bead collapsed position.

3. The apparatus claimed in claim 2 wherein the ejection cylinder is pneumatically operated.

4. An apparatus for applying a sidewall strip to a tire comprising:

(a) a base;
(b) a curing matrix on the base;
(c) a tire carriage mounted on the base having
  (i) a cylindrical drum;
  (ii) a pressure head removably mounted to the base having a foot, the foot being disposed annularly about the cylindrical outside of the drum in fixed position relative to the base and spaced above the curing matrix;
  (iii) an upper annular bead ring having a seat for engaging the upper bead of a tire, the upper bead ring being disposed about the cylindrical outside of the drum against the lower surface of the pressure head's foot;
  (iv) a lower annular bead ring having a seat for engaging the lower bead of a tire, the lower annular bead ring being disposed about the cylindrical outside of the drum and being carried by the drum;
  (v) means for supporting the upper and lower bead rings in a bead collapsed position and a bead expanded position, the bead collapsed position being with the bead rings disposed sufficiently close together to collapse the beads of a tire towards each other and firmly seat the tire's beads in the seats of the bead rings, the bead rings in the bead collapsed position being sufficiently above the curing matrix to maintain the lower sidewall of a tire carried by the bead rings spaced above the curing matrix, the bead expanded position being with the bead rings spaced apart and the lower sidewall of the tire in curing position against the curing matrix;

(d) means operative through the application of fluid pressure to force the bead rings into the bead collapsed position, the fluid pressure means being operable on the drum to urge the lower bead ring through the drum upwardly from the base towards the bead collapsed position; and (e) means to inflate the tire with air and expand the bead rings into the bead expanded position by overcoming the effect of the fluid pressure which tends to maintain the bead engaging seats in the bead collapsed position.

5. The apparatus claimed in claim 4 wherein the fluid pressure means includes:

a fluid actuated ejection cylinder having a piston, the piston being operatively coupled to the drum such that upon the application of a predetermined fluid pressure on one side of the piston the drum is urged upwardly from the curing matrix such that the lower bead ring is urged towards the bead collapsed position.

6. The apparatus claimed in claim 5 wherein:

the tire inflation means includes adjustable timer means operative to deflate the tire after a predetermined curing time.

7. The apparatus claimed in claim 6 wherein the fluid pressure means
(a) is pneumatically operable, and
(b) includes a piston shaft attached to the piston and at least two push rods attached to the piston shaft, the push rods being disposed to act against the drum.

8. The apparatus claimed in claim 7 wherein the pressure head is removably mounted to the base through a mounting shaft coaxially disposed with respect to the drum and attached to the base, the drum being slidably disposed on the mounting shaft.

9. The apparatus claimed in claim 8 wherein stops are provided on the base below the bottom of the drum, the stops being operable to contact the bottom of the drum in the bead expanded position.

10. The apparatus claimed in claim 9 wherein the tire inflation means includes a normally closed, solenoid operated inflation valve in air communication with the outside of the drum between the upper and lower bead rings, the timer means being connected in cricuit with the solenoid to open the inflation valve to a source of air when set to a predetermined curing time and to open the inflation valve to atmosphere after such predetermined curing time has expired.

11. The apparatus claimed in claim 10 wherein the inflation means includes a regulator in air communication with the inflation valve and operable to maintain a predetermined inflation pressure.

12. The apparatus claimed in claim 11 wherein the fluid pressure means includes a valve selectively operable to remove the predetermined fluid pressure from within the ejection cylinder.

13. The apparatus claimed in claim 9 wherein:

the drum includes a drum base closing the bottom of the drum and extending radially away from the cylindrical outside of the drum to form a mounting flange, the lower bead ring being carried by the mounting flange.

14. The apparatus claimed in claim 9 wherein:

(a) the upper and lower bead rings provide and airtight seal against the cylindrical outside of the drum; and
(b) the air inflation means is in air communication with the outside of the drum between the upper and lower bead rings and out of air communication with the interior of the drum.

15. An apparatus for applying a sidewall strip to a tire comprising:

(a) a base;
(b) a curing matrix on the base;
(c) a tire carriage mounted on the base having
  (i) an upper tire bead engaging seat for engaging the upper bead of a tire;
  (ii) a lower tire bead engaging seat for engaging the lower bead of a tire;
  (iii) the upper and lower tire bead engaging seats have complementary steps of different diameters for receiving the beads of different bead diameter tires; and
  (iv) means for supporting the upper and lower bead engaging seats in a bead collapsed position and a bead expanded position, the bead collapsed position being with the bead seats disposed sufficiently close together to collapse the beads of a tire towards each other and firmly seat the tire's beads in the bead engaging seats, the bead engaging seats in the bead collapsed position being sufficiently above the curing matrix to maintain the lower sidewall of a tire carried by the bead engaging seats spaced above the curing matrix, the bead expanded position being with the bead engaging seats spaced apart and the lower sidewall of the tire in curing position against the curing matrix;

(d) means operative through the application of fluid pressure to force the bead engaging seats into the bead collapsed position;

(e) means to inflate the tire with air and expand the bead engaging seats into the bead expanded position by overcoming the effect of the fluid pressure which tends to maintain the bead engaging seats in the bead collapsed position; and (f) an annular bead expander ring, the bead expander ring having an upper and a lower surface which complement the steps of the tire bead engaging seats to act on the beads of a tire in the bead collapsed position to seat such beads in the appropriate steps of the tire bead engaging seats, the annular bead expander ring also having passage means for air communicating the interior of a tire with the inflation means.

16. The apparatus claimed in claim 15 wherein:
(a) the tire carriage includes:
(i) a cylindrical drum; and
(ii) a pressure head removably mounted to the base having a foot, the foot being disposed annularly about the cylindrical outside of the drum in fixed position relative to the base and spaced above the curing matrix;

(b) the upper and lower bead engaging seats comprise respectively an upper annular bead ring and a lower annular bead ring, the upper bead ring being disposed about the cylindrical outside of the drum against the lower surface of the pressure head's foot, the lower annular bead ring being disposed about the cylindrical outside of the drum and being carried by the drum; and (c) the fluid pressure means is operable on the drum to urge the lower bead ring through the drum upwardly from the base towards the bead collapsed position.

17. The apparatus claimed in claim 16 wherein the fluid pressure means includes:

a fluid actuated ejection cylinder having a piston, the piston being operatively coupled to the drum such that upon the application of a predetermined fluid pressure on one side of the piston the drum is urged upwardly from the curing matrix such that the lower bead ring is urged towards the bead collapsed position.

References Cited
UNITED STATES PATENTS 3,113,902  12/1963  Dismuke _____ 156—116X
3,195,179   7/1965  Laube _____ 144—288(I)

BENJAMIN A. BORCHELT, Primary Examiner

S. C. BENTLEY, Assistant Examiner

U.S. Cl. X.R.
18—18; 156—394